May 1, 1956
L. M. BALLARD
2,743,829
SWEEPER CONVEYORS
Filed Dec. 24, 1951
2 Sheets-Sheet 1
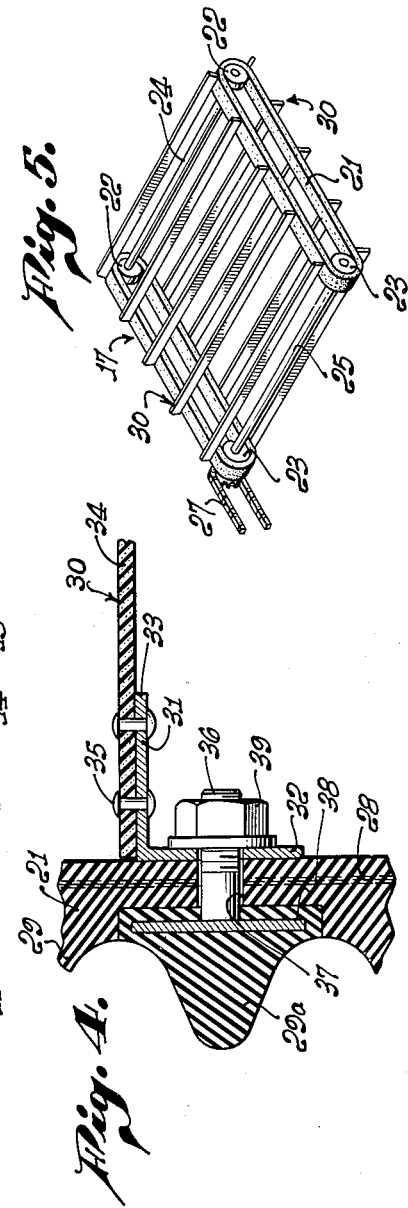
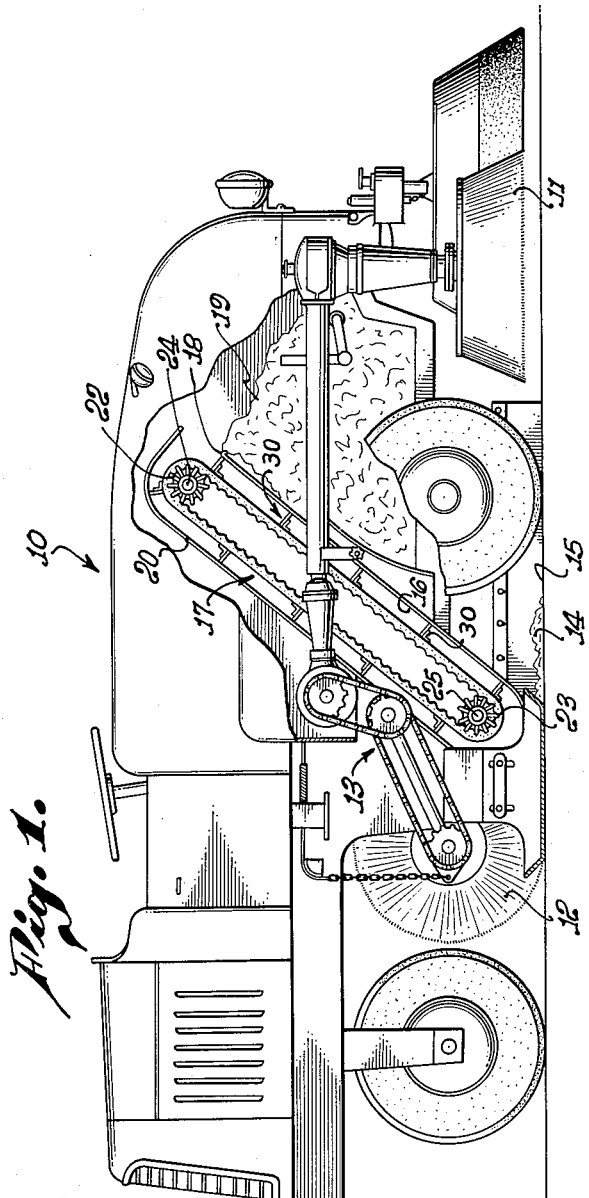
Louis M. Ballard,
INVENTOR.
BY
ATTORNEY.

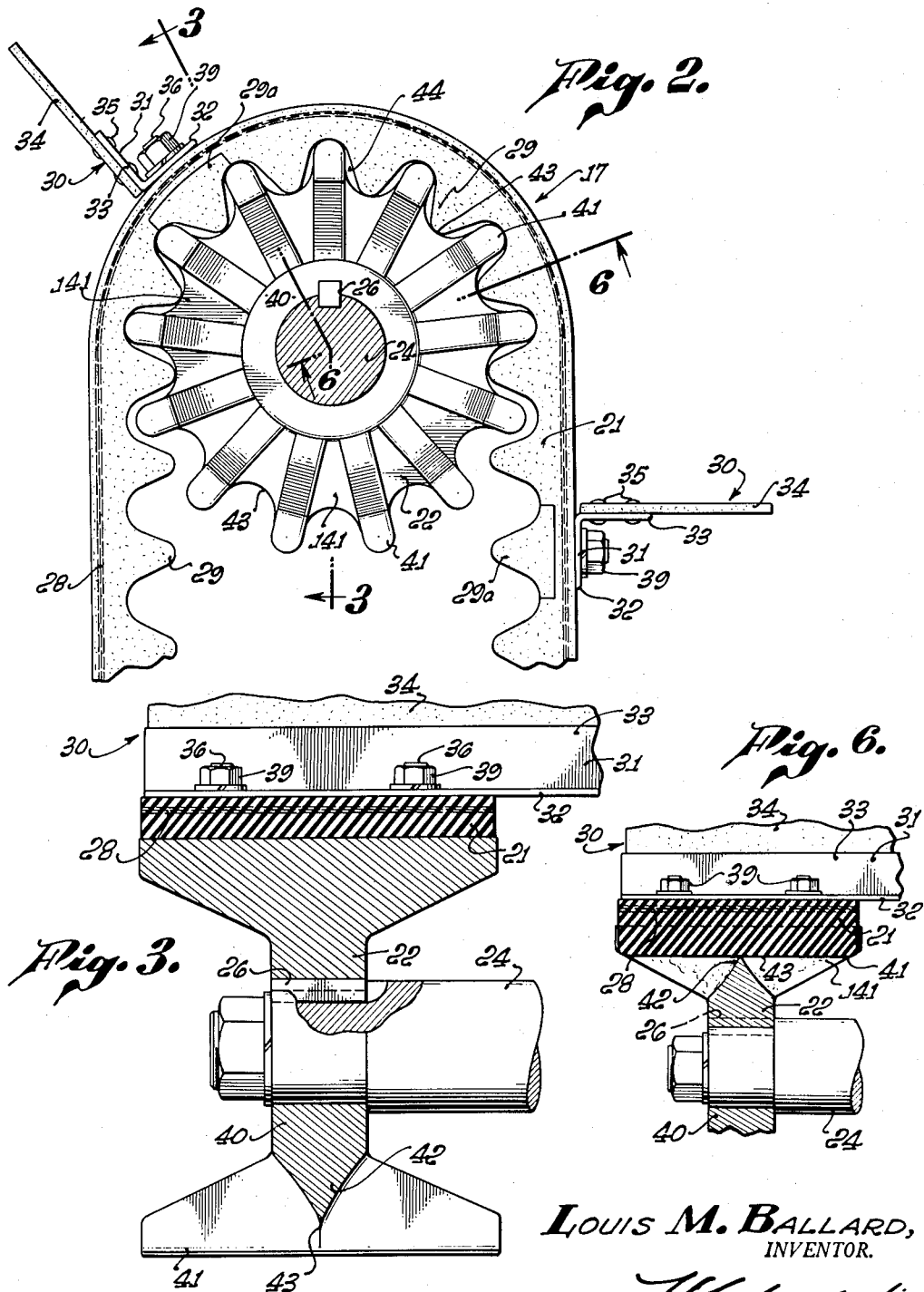

United States Patent Office
2,743,829
Patented May 1, 1956

2,743,829

SWEEPER CONVEYORS

Louis M. Ballard, Duarte, Calif., assignor to Wayne Manufacturing Company, Pomona, Calif., a corporation of California Application December 24, 1951, Serial No. 263,089

4 Claims. (Cl. 214—83.36)

This invention relates to improved endless conveyors of a type particularly adapted in certain respects for use in street sweeping machines.

Conventional street sweepers generally include a collection chamber within which debris taken from the street is accumulated, and an inclined endless conveyor acting to elevate debris from a level near the street into the chamber. This conveyor comprises an endless body, usually a flexible belt, and a number of elements projecting from and movable with the body to engage the debris and advance it upwardly along an inclined ramp into the collection chamber. The conveyor body or belt preferably is provided with a series of teeth along one side to mesh with and be positively driven by an associated sprocket wheel.

An important object of the invention is to provide, in a conveyor of the above character, improved means for mounting the debris or work engaging elements to the conveyor body, in a manner assuring completely effective retention and positioning of the elements during operation of the conveyor. Particularly contemplated is a type of mounting adapted to minimize the extent to which the work engaging elements may be deflected relative to the conveyor body by the resistance of the debris being handled.

In accordance with the invention, I employ for mounting each of the work engaging elements to the conveyor body a special mounting element which extends directly into and is preferably anchored securely within, the material of the flexible conveyor body. The flexible body may be formed of rubber, and the mounting element may comprise a rigid metallic member embedded in and vulcanized to the rubber. In order to assure most effective mounting and most accurate positioning of the work engaging elements relative to the body, I prefer to employ a type of belt body having at one of its sides a series of teeth for meshing with a driving sprocket wheel, and to then form each of the mounting elements to extend into and be anchored within one of the teeth. These teeth, like the rest of the belt body, may be formed of rubber, and the mounting elements may comprise studs secured to plates embedded in and bonded to the rubber teeth. The employment of such mounting elements anchored directly to the teeth of the belt has proven especially effective in positioning the work engaging elements during the portions of their travel when the belt is engaged by a sprocket wheel, since the teeth are then positively held by the teeth of the wheel, and the mounting elements attached to the teeth are therefore also positively positioned.

Preferably, each of the teeth to which a mounting element is secured is formed separately from and removably attached to the belt body. The mounting studs may have portions projecting from these removable teeth and extending through openings in the belt body to connect to the work engaging elements at a side of the belt opposite the side at which the teeth are carried. Fastening of the work engaging elements to the studs then serves to clamp the belt body between the teeth and work engaging elements, and thus securely fasten both of these parts to the belt. The work engaging elements may each comprise a flexible squeegee member carried and reinforced by a rigid angle iron fastened to the belt.

When the present conveyors are employed in street sweeping machines, I preferably employ a conveyor system including two spaced and parallel belts, and a number of debris engaging elements mounted at their opposite ends to and extending horizontally between the two belts.

Further features of the invention have to do with a special formation of the interengaging teeth of the sprocket wheel and belt, in a manner to prevent the accumulation of dirt and debris between those teeth.

In particular, I prevent such dirt accumulation by forming one of the interengaging parts to be of such open formation as to permit any debris trapped between the members to freely escape. For this purpose, the portions of one of the parts, preferably the sprocket wheel, between its successive teeth may have transverse dimensions substantially smaller than the teeth themselves, to form alongside those portions a number of passages or openings through which debris may escape from the spaces between the teeth of that member. Also, these inter-tooth portions are desirably formed to taper transversely of the wheel to relatively sharp edges, in a manner to cut any dirt mass which may be present into two pieces and then displace the two pieces in opposite directions and out of the space between the wheel and belt.

The above and other features and objects of the present invention will be better understood from the following detailed description of the typical embodiment illustrated in the accompanying drawings, in which:

Fig. 1 is a side view of a street sweeping machine embodying the invention, the side wall of the machine being partially broken away to reveal the inner debris elevating conveyor;

Fig. 2 is an enlarged fragmentary side view of one of the conveyor belts, the associated debris engaging elements, and one of the belt driving sprocket wheels;

Fig. 3 is an axial section through the belt and sprocket wheel of Fig. 2, taken along line 3—3 of that figure;

Fig. 4 is an enlarged fragmentary section through one of the debris advancing elements and the portion of one of the endless belts to which that element is mounted;

Fig. 5 is a perspective view of the elevator conveyor assembly; and

Fig. 6 is a fragmentary section taken on line 6—6 of Fig. 2.

I have represented in Fig. 1 a street sweep-machine or vehicle 10, having the usual forward gutter brush 11 and rear transverse main brush 12, both of which are driven by the engine of the vehicle through a suitable drive system 13. Transverse brush 12 acts to sweep the debris 14 forwardly from the street surface 15 onto the lower portion of an inclined elevator ramp 16. This ramp may be formed of sheet metal and preferably extends substantially entirely across the transverse extent of the street sweeping machine. The debris is advanced upwardly along ramp 16 by an elevator conveyor assembly generally indicated at 17, and falls from an upper end 18 of the ramp into a debris accumulating chamber 19 at the forward end of the machine. The space within which conveyor 17 is contained is closed along the upper side and upper end of the conveyor by a sheet metal wall or partition 20.

Referring now to Fig. 5, the conveyor 17 includes a pair of laterally spaced, parallel, endless belts 21 positioned at opposite sides of the vehicle and inclined at an angle corresponding to the inclination of ramp 16. For advancing debris upwardly along ramp 16, a number of debris engaging units 30 extend horizontally between corresponding portions of belts 21, and move upwardly along the upper surface of ramp 16 in correspondence with the belt movements.

The upper and lower ends of the belts extend about upper and lower sprocket wheels 22 and 23, the two upper sprocket wheels being mounted to opposite end portions of a first shaft, and the two lower sprocket wheels being mounted to opposite end portions of a second shaft 25. Each of the four sprocket wheels is suitably keyed to the associated shaft, as by key 26 of Figs. 2 and 3, to maintain the two belts in unison at all times. One or both of the shafts 24 and 25 are driven, as by a chain and sprocket drive 27, in a direction causing angularly upward advancement of the lower extents of belts 21, and downward movement of the upper extents of those belts.

Each of belts 21 comprises an elongated endless flexible body, whose lateral width is preferably greater than its thickness. This belt body may be formed of a suitable strong but flexible rubber, which is desirably reinforced by one or more plies of woven fabric 28 embedded in and extending along the entire length of the belt body. At its inner side, each belt presents a series of transversely extending spaced teeth 29 for engaging the sprocket wheels 22 and 23.

The teeth 29 may be formed of a resilient rubber, and most of them are preferably molded integrally with the rubber body of the belt. Certain ones of the teeth 29a, however, at predetermined locations spaced along each belt, are formed separately from and are removably attachable to the body of the belt. These separately formed removable teeth 29a are preferably formed of the same type of rubber as the belt body and other teeth, and are employed for anchoring the debris engaging units 30 to the belts.

Each of the transverse debris engaging units 30 includes a transversely extending elongated angle iron 31, having an inner portion 32 extending transversely across the outer surfaces of the two belts, and an outwardly projecting portion 33 to which is mounted a flexible transversely extending sheet-like squeegee element 34. The squeegee element 34 may be formed of a suitable resilient rubber, and projects into engagement with ramp 16 in order to wipe debris upwardly along the ramp as the belts are driven. Squeegee 34 may be attached to angle iron 31 in any suitable manner, as by rivets 35.

Each of the angle irons 31 is fastened at its opposite ends to corresponding portions of the two belts 21 by pairs of mounting studs 36. The two studs at each end of each angle iron extend through a pair of openings 37 in the body of one of the belts, and are embedded in and bonded to one of the removable rubber teeth 29a of that belt. For assuring positive retention of the studs to that removable tooth, the studs are welded or otherwise secured to a plate 38, which is embedded in and extends transversely across a major portion of the removable tooth. At their outer ends, studs 36 carry nuts 39, which are tightened against the angle iron to securely fasten the debris engaging squeegees to the belts.

The sprocket wheels 22 and 23 are of a special formation to assure effective transmission of driving force to the belts, while at the same time preventing the accumulation of dirt or other debris within the inter-tooth recesses of the wheels. Each of the sprocket wheels has a hub portion 40 of relatively small transverse dimension, carrying a series of circularly spaced belt engaging teeth 41 of a width considerably greater than the hub. The width of teeth 41 desirably corresponds to the width of belt 21 (see Fig. 3). Between teeth 41, the sprocket wheel hub terminates outwardly in a number of intermediate inwardly recessed portions 42 having dimensions transversely of the wheel substantially smaller than the teeth. These inter-tooth portions of the wheel desirably taper radially outwardly and transversely of the wheel from the hub width to a relatively sharp outer knife edge 43. As best seen in Fig. 6, this knife edge serves to cut into two portions any mass of dirt or debris trapped between the belt teeth and the inter-tooth portions 42 of the sprocket wheel and to then displace the two masses of debris in opposite directions from between the belt and wheel. At opposite sides of these inter-tooth portions 42 of the wheel, teeth 41 are spaced apart along their entire radial extents, to form between their radially inner portions a number of openings or passages 141 through which debris may escape radially inwardly from the spaces between teeth. It is also noted that even at the smallest portions of the inter-tooth recesses of the sprocket wheel, i. e. at the locations of knife edges 43, these recesses preferably have areas greater than the belt teeth (see Fig. 2), so that the belt teeth are spaced from the sprocket wheel along their sides 44, to further assure against difficulties resulting from the presence of debris between the belt and sprocket wheel. The belt teeth may however be formed to directly engage the sharp edges 43 of the sprocket wheel at the peaks 43 of the teeth, to assure an effective cutting of the debris mass into two parts.

In use, the street sweeping vehicle moves to the right as seen in Fig. 1, with brushes 11 and 12 and conveyor 17 continuously operating. Brush 11 sweeps debris from a gutter along which the vehicle is driven, while brush 12, rotating in counterclockwise direction as seen in Fig. 1, sweeps debris forwardly onto the lower slightly inclined portion of ramp 16. Endless conveyor 17 moving in a counterclockwise direction as seen in Fig. 1 advances the debris upwardly along ramp 16 and into chamber 19.

The debris moving along ramp 16 is directly engaged and advanced by squeegee elements 34. The special mounting of elements 34 to the belts, as shown in Fig. 4, positively positions the squeegees in their desired outwardly projecting positions, and prevents unwanted deflection of the squeegees relative to the belts under the influence of the debris being elevated.

I claim:

1. In a street sweeper, a debris chamber having an opening in an upper portion thereof, an inclined ramp along which debris may be elevated toward said opening for delivery into said chamber, and means for elevating debris along said ramp into the chamber, said elevating means including a pair of inclined laterally spaced endless flexible rubber belts, toothed sprocket wheels mounting said belts for endless movement, rubber teeth carried by said belts and engaging the teeth of said sprocket wheels, some of said teeth being formed separately from and removably attached to the belt, angle irons extending transversely between and across said belts at spaced locations therealong, rubber squeegee elements carried by said angle iron and movable upwardly along the upper side of said ramp to advance the debris therealong, studs embedded in and bonded to said removable belt teeth and projecting therefrom through openings in said belt and then through openings in said angle irons, nuts threaded onto said studs to fasten said angle irons and removable teeth to the belts, and plates attached to said studs and embedded in said removable teeth.

2. In a street sweeping motor vehicle, the combination comprising a debris chamber having an opening in an upper portion thereof, a conveyor operable to elevate debris from a level near the street and feed it into said chamber through said upper opening, and an inclined ramp along which debris is elevated into said chamber by said conveyor, said conveyor comprising a pair of inclined essentially parallel laterally spaced endless flexible rubber belts having rubber teeth spaced therealong, sprocket wheels for driving said belts and having teeth interfitting with said belt teeth, and units carried by and extending transversely between said endless rubber belts and acting to engage and elevate debris as the belts move, each of said rubber belts and most of its carried rubber teeth being formed integrally.

3. In a street sweeping motor vehicle, the combination as recited in claim 2, in which said debris engaging units include angle irons extending transversely between said belts at locations spaced therealong, and rubber squeegee elements carried by said angle irons for moving along said ramp and engaging and acting against the debris.

4. In a street sweeping motor vehicle, the combination comprising a debris chamber having an opening in an upper portion thereof, a conveyor operable to elevate debris from a level near the street and feed it into said chamber through said upper opening, and an inclined ramp along which debris is elevated into said chamber by said conveyor, said conveyor comprising a pair of inclined essentially parallel laterally spaced endless flexible belts having teeth spaced therealong, said belts and teeth being formed of resiliently deformable material, sprocket wheels for driving said belts and having teeth interfitting with said belt teeth, and units carried by and extending transversely between said endless belts and acting to engage and elevate debris as the belts move, each of said belts and most of its carried teeth being formed integrally.

References Cited in the file of this patent

UNITED STATES PATENTS

| | | |
|---|---|---|
| D. 29,142 | Dunn | Aug. 2, 1898 |
| 527,723 | Sargent et al. | Oct. 16, 1894 |
| 536,813 | MacPhail et al. | Apr. 2, 1895 |
| 597,096 | Beckwith | Jan. 11, 1898 |
| 712,020 | Tinsley | Oct. 28, 1902 |
| 886,263 | Smith | Apr. 28, 1908 |
| 1,547,276 | Wentz | July 28, 1925 |
| 2,109,123 | White | Feb. 22, 1938 |
| 2,227,557 | Sinden | Jan. 7, 1941 |
| 2,264,332 | Peterson | Dec. 2, 1941 |
| 2,381,892 | Fees | Aug. 14, 1945 |
| 2,461,150 | Flynn et al. | Feb. 8, 1949 |
| 2,534,679 | Place | Dec. 19, 1950 |
| 2,538,242 | Hannon | Jan. 16, 1951 |
| 2,627,756 | Bendall | Feb. 10, 1953 |
| 2,704,150 | Scranton | Mar. 15, 1955 |